(No Model.) 2 Sheets—Sheet 1.

W. HILLMAN.
METALLIC TUBE.

No. 538,164. Patented Apr. 23, 1895.

Attest:
Walter E. Allen.
S. Allen.

Inventor.
William Hillman.
By Knight Bros.
Attorneys.

(No Model.) 2 Sheets—Sheet 2.
W. HILLMAN.
METALLIC TUBE.
No. 538,164. Patented Apr. 23, 1895.
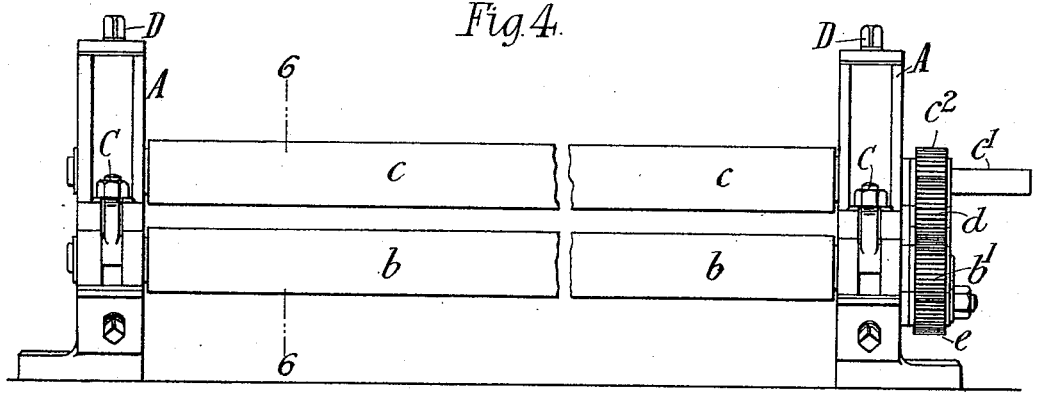
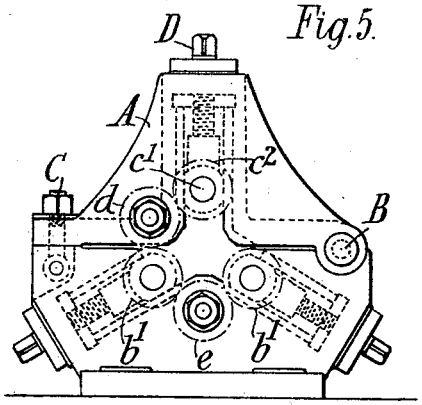 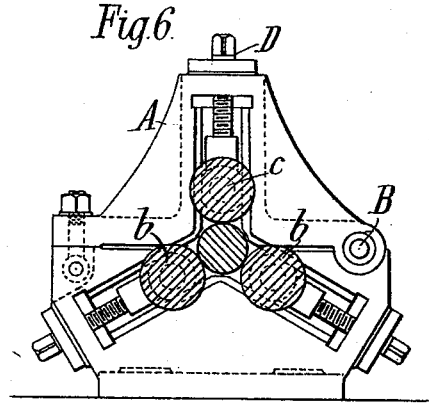
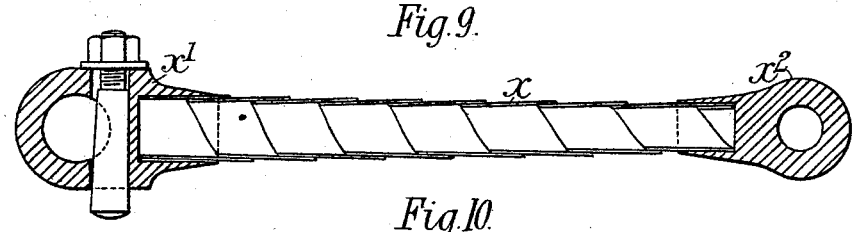
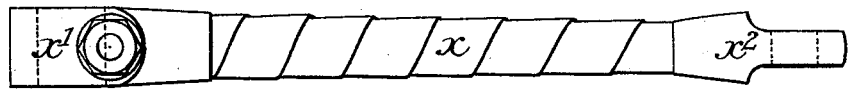
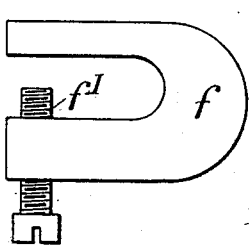
Attest:
Walter E. Allen
S. Allen
Inventor.
William Hillman
By Knight Bros.
Attorneys.

UNITED STATES PATENT OFFICE.

WILLIAM HILLMAN, OF COVENTRY, ENGLAND.

METALLIC TUBE.

SPECIFICATION forming part of Letters Patent No. 538,164, dated April 23, 1895.

Application filed May 22, 1894. Serial No. 512,093. (No model.) Patented in England January 2, 1892, No. 82, and in France May 16, 1892, No. 221,658.

*To all whom it may concern:*

Be it known that I, WILLIAM HILLMAN, a subject of the Queen of Great Britain, residing at Coventry, in the county of Warwick, England, have invented certain new and useful Improvements in Metallic Tubes, (for which I have obtained patents in Great Britain, No. 82, bearing date January 2, 1892, and in France, No. 221,658, bearing date May 16, 1892,) of which the following is a specification.

The invention relates to the manufacture of an improved tube for use more particularly in the construction of velocipede frames and the like, and said tube is represented in the accompanying drawings, in which—

Figure 2:
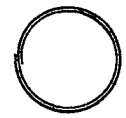
Figure 1:
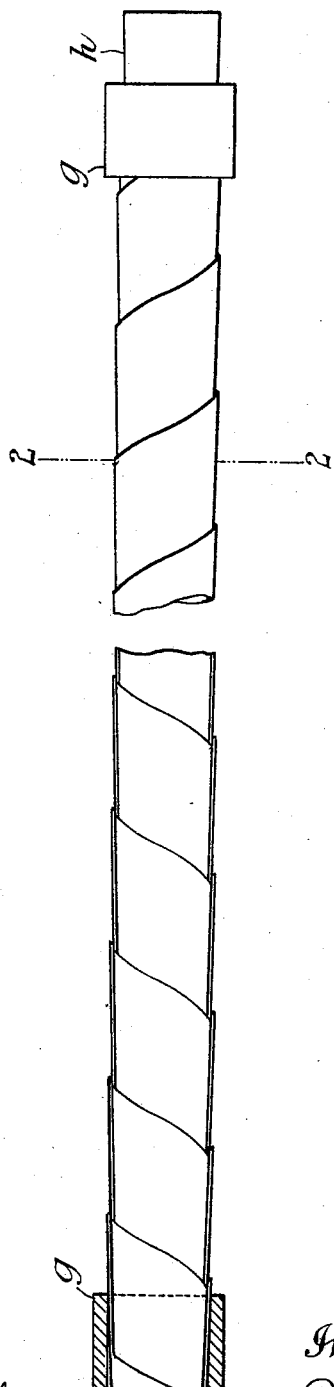
Figure 3:
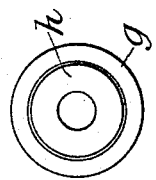
Figure 7:
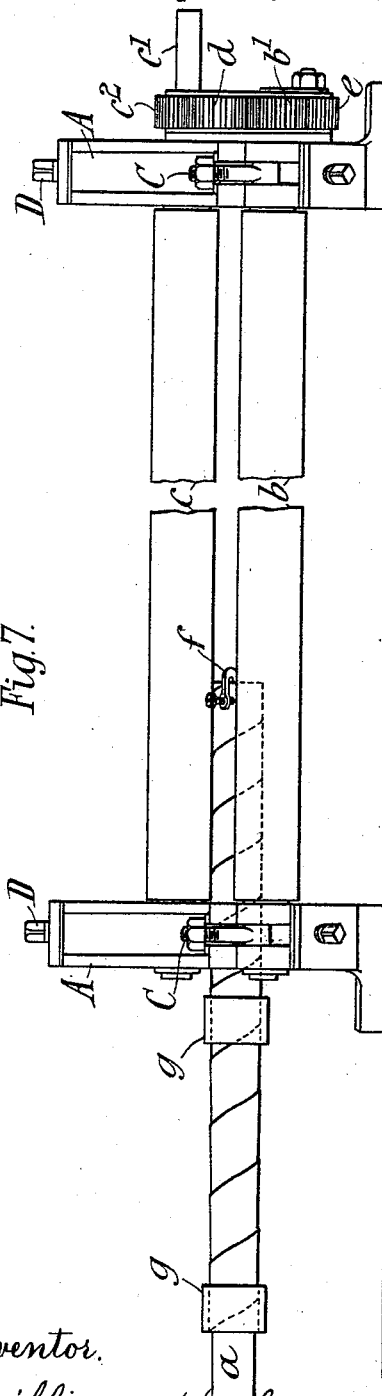

Figure 1 is partly a longitudinal section and partly an external view of the improved tube in process of manufacture, showing the method of holding the same securely at its ends during the process of soldering or brazing. Fig. 2 is a cross section on the line 2—2 of Fig. 1. Fig. 3 is an end view of Fig. 1. Fig. 4 is a side elevation, Fig. 5 is an end view and Fig. 6 is a cross section on the line 6—6 of Fig. 4, of apparatus suitable for employment in coiling the tubing. Fig. 7 is a side view of parts of the machine shown at Figs. 4, 5 and 6, illustrating the application of a cramp and retaining collars to the tube coiled therein. Fig. 8 is a side view of a cramp suitable for use in securing the last coiled end of the tube previous to removing it from the coiling machine. Fig. 9 is a longitudinal section and Fig. 10 is a plan or top view of a crank to which my invention is applied.

The improved tubes are made from bright cold-rolled sheet crucible steel of high quality and of gages and widths varying according to the diameter and strength of the tubes required. This sheet steel is cut into ribbons of the required length and width to suit the pitch of coiling, the number of thicknesses of steel required for the walls of the tube, and the length of the latter, and the ribbons have plain cut edges as they merely overlap and do not fit against each other. The steel ribbon is cut at its ends to such an angle that when coiled into a tube, the latter shall have its ends at right angles to its axis.

The next process is to slightly coil the starting end of the strip or ribbon, so that it may lap partly round the mandrel $a$ upon which it is to be coiled in the machine.

For the next operation the upper part A of the machine is raised on its hinges B situated at the back of the machine, and the mandrel $a$ with the strip or ribbon coiled upon it for about half a convolution is laid on the two lower rolls $b$ $b$, the strip or ribbon at such time hanging over toward the operator. The upper part A of the machine is then brought again into position on the lower part and there fixed by two clamping screws and nuts C. The top roll $c$ is now adjusted by the screws D until sufficient friction is caused between the rolls and the strip or ribbon to cause it to be coiled round the mandrel upon the rolls $b$ $b$ and $c$ being rotated by a handle fixed to the prolongation $c'$ of the upper roll $c$, from which roll $c$ motion is communicated to the rolls $b$ $b$ by means of toothed gearing $c^2$, $d$, $b'$, $e$ and $b'$. The strip or ribbon is coiled upon the mandrel $a$, so as to obtain a tube of the required length and with the edges overlapping each other to any required width, but so that the tube shall have at least two thicknesses of metal at every part along its entire length. The top roll $c$ is then very slightly raised and the mandrel partly pushed out of the tube thereon from the handle end of the machine. One jaw of a cramp $f$, such as that shown at Fig. 8, is then inserted within that end of the tube from which the mandrel $a$ has been pushed out, and the screw $f'$ in the other jaw of such cramp is then screwed up tightly so as to securely grip the end of the coil. The tube is now pushed out of the machine endwise, away from the handle end of the machine, and two collars $g$ $g$ of an internal diameter corresponding to the outside diameter of the tube are slipped on, one being placed at one end of the tube and the other at the other end, close against the cramp $f$.

In Fig. 7 the tube is shown partly pushed out from the machine with the cramp $f$ fixed at one end and a collar $g$ at the other end, while a second collar is on the intermediate part of the tube in readiness to be pushed along the same as far as the cramp $f$.

When the collars $g$ $g$ are in their proper position on the tube, the mandrel is withdrawn entirely from the latter and the upper portion A of the machine is again raised upon its hinges B and the tube removed. The collars $g\ g$ on the tube will prevent its untwisting to any undue extent, so that the cramp $f$ can now be removed and a plug $h$ inserted in that end and driven up tightly, so as to grip the end of the tube between it and the collar $g$, the operator at the same time twisting the tube with his left hand so as to bring the coils as closely together as possible. The tube is now charged with a mixture of borax and spelter mixed well with water, the charge being well spread over the interior of the tube by shaking and oscillating it to and fro. A rather stiffer mixture of the same materials is also made, which is placed round the joints of the tube on the outside. The tube is now ready for brazing, which operation is performed by placing it in a furnace preferably heated to the requisite temperature by gas, so as to effect the brazing of the joints of the tube without injury to the character of the steel. When the brazing materials have fluxed properly, the tube is grasped by a pair of tongs and pushed backward and forward and rolled over several times, in order that the spelter shall get completely round the joints and thereby make the tube perfectly solid. After removal from the furnace the tube is laid in a bed of lime and covered over with the same material, to prevent its cooling too rapidly. When the tube is cold the plug $h$ is withdrawn, the collars $g\ g$ removed, and the ends of the tube cut off perfectly square.

The crank shown at Figs. 9 and 10 has the arm formed of a tube $x$ constructed as above described, the said tube being brazed or soldered into sockets formed in solid ends $x'\ x^2$.

By the use of helically coiled sheet steel tubes made as above described in the construction of velocipedes, the latter are capable of being made much lighter, strength for strength, than when employing the ordinary weldless steel tubes.

By coiling the steel ribbon so that the coils shall overlap each other slightly more than half their width, so as to secure at least two thicknesses at every part of the tube and three thicknesses for a narrow space along the joints, I obtain a stronger, stiffer and more reliable tube than could be obtained by using the same weight of metal in a thicker ribbon having the coils only slightly overlapping each other and forming a tube with generally only one thickness of metal.

Having fully described my invention, what I desire to claim and secure by Letters Patent is—

As a new article of manufacture, a helically coiled continuous flat metal ribbon tube having plain edges overlapping each other slightly more than half the width of the preceding coil whereby two thicknesses of metal are provided throughout the completed tube, and three thicknesses at the joints, substantially as described.

WILLIAM HILLMAN.

Witnesses:
GRAHAM I. FRANCIS,
HARRY C. WILLSON.